United States Patent
Joung

(10) Patent No.: US 6,981,521 B2
(45) Date of Patent: Jan. 3, 2006

(54) EXHAUST VALVE FOR SEMICONDUCTOR MANUFACTURING PROCESS

(75) Inventor: Tae-Yeol Joung, Hwaseong (KR)

(73) Assignee: Daemyung Engineering Co., Ltd., (KR)

( * ) Notice: Subject to any disclaimer, the term of this patent is extended or adjusted under 35 U.S.C. 154(b) by 147 days.

(21) Appl. No.: 10/779,651

(22) Filed: Feb. 18, 2004

(65) Prior Publication Data

US 2004/0163720 A1    Aug. 26, 2004

(30) Foreign Application Priority Data

Feb. 20, 2003   (KR)   ................ 10-2003-0010580

(51) Int. Cl.
    *F16K 11/085* (2006.01)

(52) U.S. Cl. ................... 137/625.47; 137/375

(58) Field of Classification Search ........... 137/625.47, 137/375

See application file for complete search history.

(56) References Cited

U.S. PATENT DOCUMENTS 2,471,941 A * 5/1949 Downey ............... 137/625.47
3,498,317 A * 3/1970 Duffey ................. 137/375
3,960,167 A * 6/1976 Ros .................... 137/375

* cited by examiner

*Primary Examiner*—John Fox
(74) *Attorney, Agent, or Firm*—Nixon Peabody LLP; Jeffrey L. Costellia

(57) ABSTRACT

The Invention relates to an exhaust valve for a semiconductor manufacturing process, which can improve sealability of the exhaust valve, prevent leakage of exhaust gas, and increase the cleaning period, more concretely, The exhaust valve includes a valve body having a chamber formed at the center thereof; a rotary cylinder rotatably coupled to the chamber of the valve body; a protective cover coupled to the outer circumferential surface of the rotary cylinder; an exhaust guide member coupled to the lower portion of the valve body; an adapter seated on the upper portion of the valve body and surrounding the shaft portion of the rotary cylinder; an actuator coupled to the upper portion of the adapter for rotating the rotary cylinder; and sensing means mounted at the upper portion of the valve body, wherein a first sealing member is mounted between the rotary cylinder and the protective cover.

3 Claims, 4 Drawing Sheets

EXHAUST VALVE FOR SEMICONDUCTOR MANUFACTURING PROCESS

BACKGROUND OF THE INVENTION

1. Field of the Invention

The present invention relates to an exhaust valve for a semiconductor manufacturing process, and more particularly, to an exhaust valve for a semiconductor manufacturing process, which can change a direction for selectively treating exhaust gas used during the semiconductor manufacturing process.

2. Background of the Related Art

In general, as toxic gases of various kinds used for a semiconductor manufacturing process may cause environmental pollution and are harmful to human body, they are discharged to the air below the permissible exhaust concentration after being burned or dissolved in water.

FIG. 1 is a view of a conventional exhaust valve for a semiconductor manufacturing process.

As shown in the drawing, the exhaust valve for the semiconductor manufacturing process includes: a valve body 1 having a chamber formed at the center thereof and exhaust ports 1a and 1b formed at left and right sides thereof and connected to treatment devices respectively; a rotary cylinder 2 rotatably coupled to the chamber of the valve body 1, the rotary cylinder 2 having an inlet 2a formed in the lower portion thereof for entrance of exhaust gas, an opening 2b formed at a side thereof and communicating with the inlet 2a so as to selectively open and close the exhaust ports 1a and 1b, and a shaft portion 2c formed on the upper portion thereof; a protective cover 3 coupled to the outer circumferential surface of the rotary cylinder 2; an exhaust guide member 4 coupled to the lower portion of the valve body 1 for guiding exhaust gas discharged from a vacuum pump to the inlet 2a of the rotary cylinder 2; an adapter 5 seated on the upper portion of the valve body 1 and surrounding the shaft portion 2c of the rotary cylinder 2; an actuator 6 coupled to the upper portion of the adapter 5 for rotating the rotary cylinder 2 in right and left directions; and sensing means 7 mounted at the upper portion of the valve body 1 for sensing the opening position of the exhaust ports 1a and 1b.

In the conventional exhaust valve for the semiconductor manufacturing process, the actuator 6 is operated by electric signal of a controller, and then, the rotary cylinder 3 is rotated in the right and left directions.

By the rotation of the rotary cylinder 3, the opening 2b of the rotary cylinder 2 coincides with the exhaust ports 1a and 1b of the valve body 1, and thereby, the exhaust gas discharged from the chamber, in which the semiconductor manufacturing process is carried out, can be discharged to the vacuum pump.

However, gases used during the semiconductor manufacturing process, particularly, silane(SiH$_4$), is powdered during the exhaust step and adhered onto a contact portion of the exhaust valve, and so, it may cause wrong operation and explosion if the exhaust direction is changed.

Furthermore, when powder is adhered on the exhaust valve, the exhaust valve must be cleaned periodically in a short time(at about 7-day intervals). However, at this time, the operation for the semiconductor manufacturing process must be stopped, and thereby, it causes deterioration of productivity.

SUMMARY OF THE INVENTION

Therefore, the present invention has been made in view of the above problems, and it is an object of the present invention to provide an exhaust valve for a semiconductor manufacturing process, which can increase sealability of the exhaust valve, and extend the period of cleaning.

To accomplish the above object, according to one aspect of the present invention, there is provided an exhaust valve for a semiconductor manufacturing process including: a valve body having a chamber formed at the center thereof and exhaust ports formed at left and right sides thereof and connected to treatment devices respectively; a rotary cylinder rotatably coupled to the chamber of the valve body, the rotary cylinder having an inlet formed in the lower portion thereof for entrance of exhaust gas, an opening formed at a side thereof and communicating with the inlet so as to selectively open and close the exhaust ports, and a shaft portion formed on the upper portion thereof; a protective cover coupled to the outer circumferential surface of the rotary cylinder; an exhaust guide member coupled to the lower portion of the valve body for guiding exhaust gas discharged from a vacuum pump to the inlet of the rotary cylinder; an adapter seated on the upper portion of the valve body and surrounding the shaft portion of the rotary cylinder; an actuator coupled to the upper portion of the adapter for rotating the rotary cylinder in right and left directions; and sensing means mounted at the upper portion of the valve body for sensing the opening position of the exhaust ports, wherein a first sealing member is mounted between the rotary cylinder and the protective cover.

A second sealing member is mounted between the chamber of the valve body and the outer circumferential surface of the protective cover.

The first and second sealing members are O-rings.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
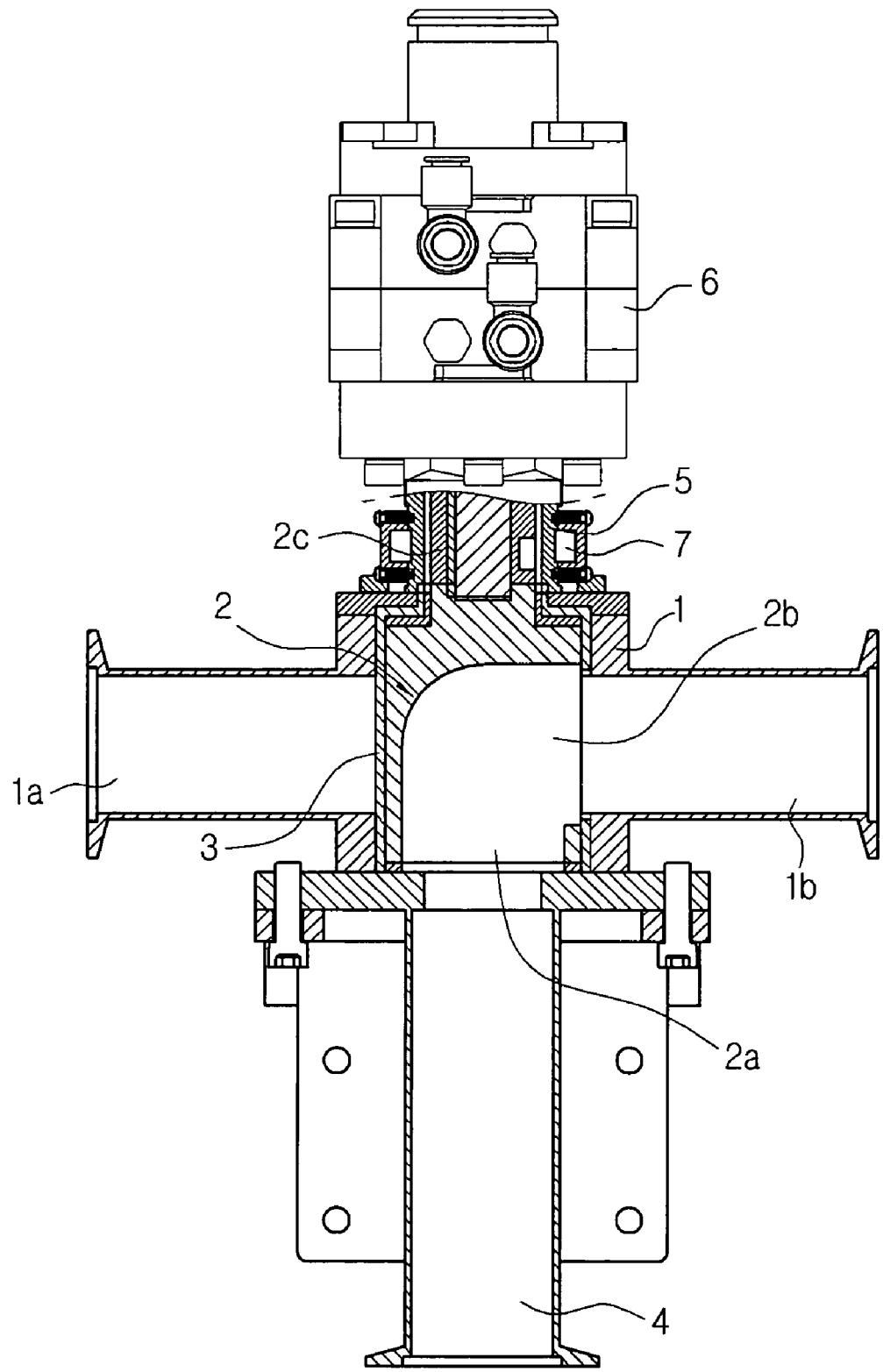
FIG. 1 is a sectional view of a conventional exhaust valve for a semiconductor manufacturing process.
Figure 2:
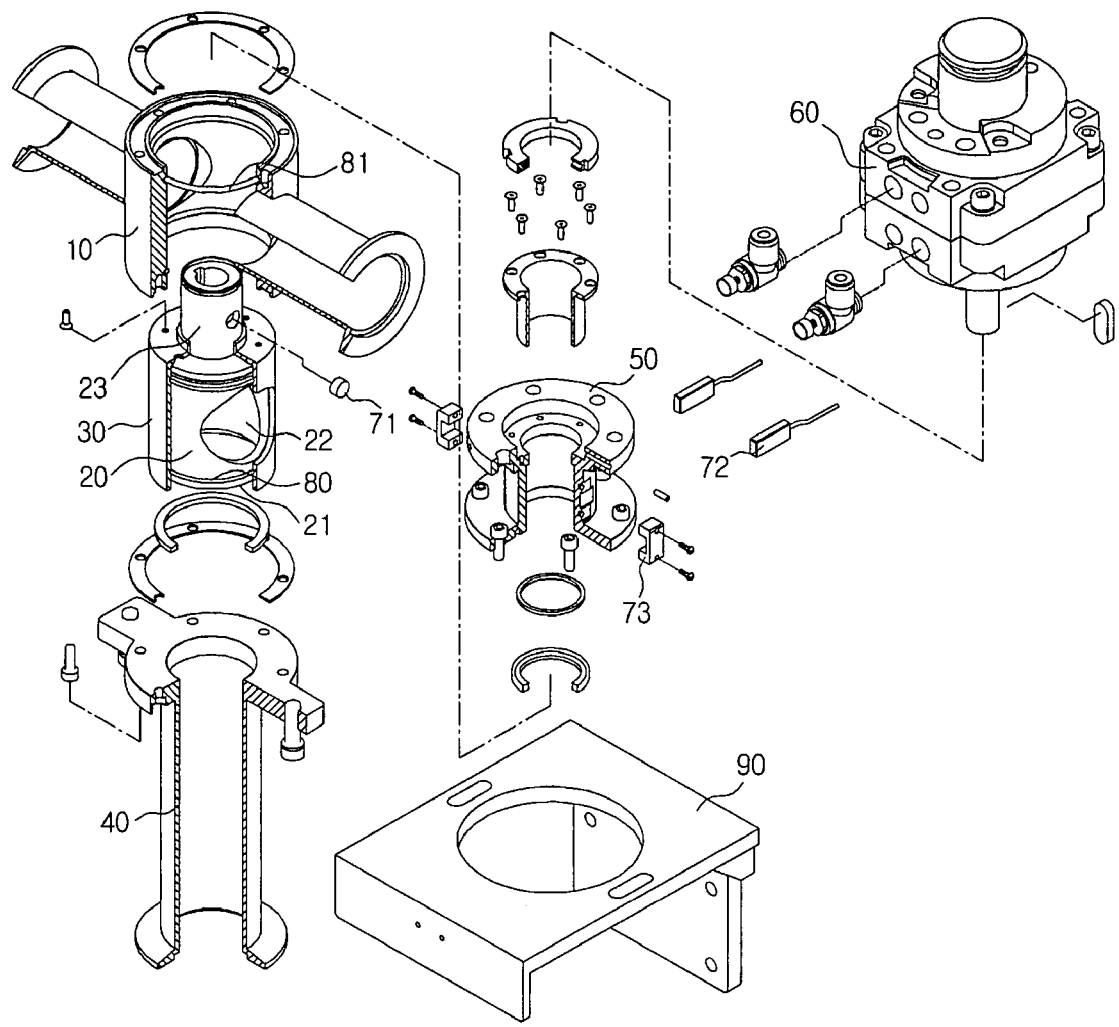
FIG. 2 is a perspective view of an exhaust valve for a semiconductor manufacturing process according to a preferred embodiment of the present invention.
Figure 3:
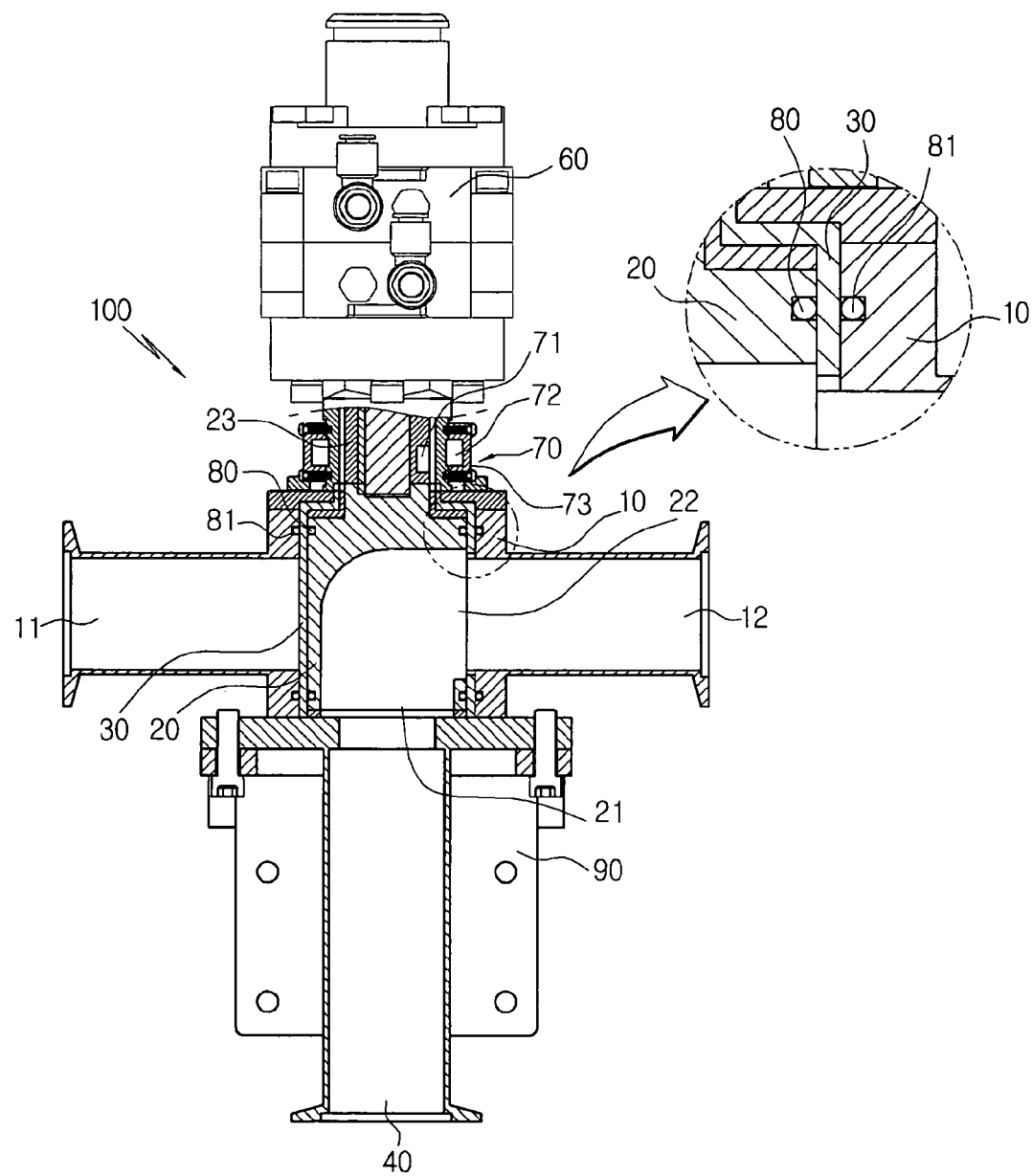
FIG. 3 is a sectional view of the exhaust valve for the semiconductor manufacturing process according to the preferred embodiment of the present invention.

FIGS. 2 and 3 show an exhaust valve for a semiconductor manufacturing process according to the present invention. In the drawings, the reference numeral 100 designates the exhaust valve according to the present invention.

As shown in the drawings, the exhaust valve 100 includes a valve body 10 having a chamber formed at the center thereof and exhaust ports 11 and 12 formed at left and right sides thereof and connected to treatment devices respectively; a rotary cylinder 20 rotatably coupled to the chamber of the valve body 10, the rotary cylinder 20 having an inlet 21 formed in the lower portion thereof for entrance of exhaust gas, an opening 22 formed at a side thereof and communicating with the inlet 21 so as to selectively open and close the exhaust ports 11 and 12, and a shaft portion 23 formed on the upper portion thereof; a protective cover 30 connected to the outer circumferential surface of the rotary cylinder 20; an exhaust guide member 40 coupled to the lower portion of the valve body 10 for guiding exhaust gas discharged from a vacuum pump to the inlet 21 of the rotary cylinder 20; an adapter 50 seated on the upper portion of the valve body 10 and surrounding the shaft portion 23 of the rotary cylinder 20; an actuator 60 coupled to the upper portion of the adapter 50 for rotating the rotary cylinder 20 in right and left directions; and sensing means 70 mounted at the upper portion of the valve body 10 for sensing the opening position of the exhaust ports 11 and 12. The above structure of the present invention is the same as the prior arts, but the present invention has more improved sealability of the exhaust valve than the prior arts.

The present invention will be described in more detail. A first sealing member 80 is mounted between the rotary cylinder 20 and the protective cover 30, and a second sealing member 81 is mounted between the chamber of the valve body 10 and the outer circumferential surface of the protective cover 30.

Furthermore, preferably, the first and second sealing members 80 and 81 are O-rings.

The sensing means 70 includes a magnetic sensor 71 connected to a side of the shaft portion 23 of the rotary cylinder 20, and sensors 72 mounted at both sides of the outer surface of the adapter 50. The sensors 72 are fixed to sensor brackets 73.

That is, the magnetic sensor 71 is coupled to the shaft portion 23 located at the same side as the opening 22 of the rotary cylinder 20, and the sensors 72 mounted on the outer surface of the adapter 50 sense the position of the magnetic sensor 71.

Meanwhile, unexplained reference numeral 90 designates a bracket for fixing the exhaust valve.

Figure 4:
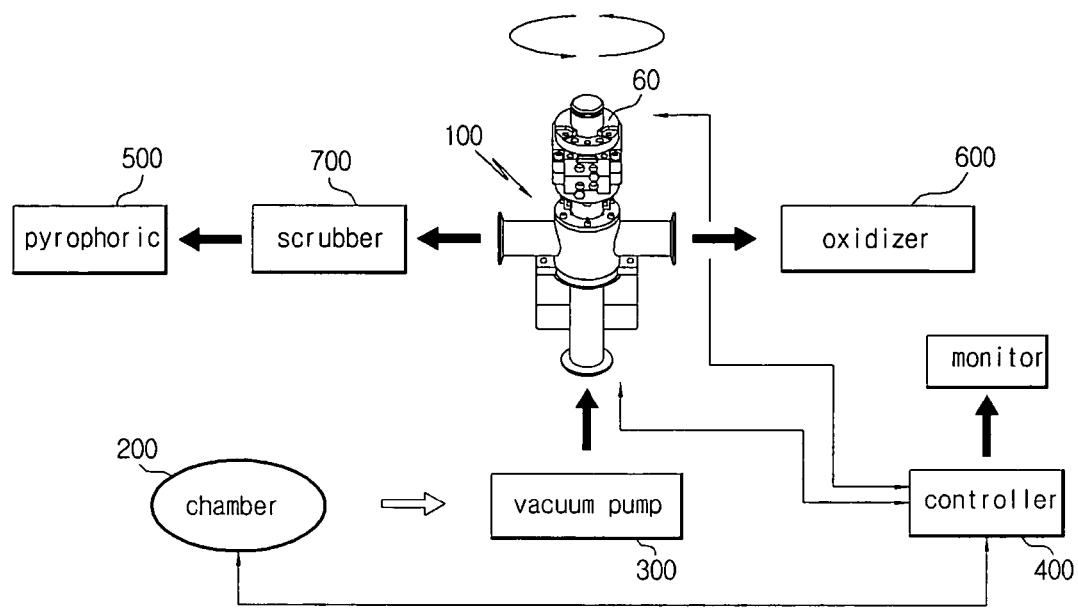
FIG. 4 is a flow chart showing flow of gas according to the present invention.

FIG. 4 is a flow chart showing flow of gas according to the present invention.

As shown in the drawing, gas is induced from the chamber 200, in which the semiconductor manufacturing process is carried out, to the exhaust guide member of the exhaust valve by a vacuum pump 300.

A controller 400 operates the actuator 60 and determines a discharge direction of exhaust gas, i.e., toward a pyrophoric device 500 or an oxidizing device 600 according to kinds of the induced exhaust gas.

That is, gas, which is naturally burned like silane($SiH_4$), is moved to the pyrophoric device 500 through a scrubber 700, and treated.

At this time, exhaust gas is sealed by the first and second sealing members 80 and 81, and the cleaning period can be increased to about 21 days as powdering of gas is reduced.

As set forth above, the exhaust valve for the semiconductor manufacturing process according to the present invention provides the first and second sealing members, thereby improving sealability of the exhaust valve, preventing leakage of exhaust gas, and increasing the cleaning period.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An exhaust valve for semiconductor manufacturing process, comprising:

a valve body having a chamber formed at the center thereof and exhaust ports formed at left and right sides thereof and connected to treatment devices respectively;

a rotary cylinder rotatably coupled to the chamber of the valve body, the rotary cylinder having an inlet formed in the lower portion thereof for entrance of exhaust gas, an opening formed at a side thereof and communicating with the inlet so as to selectively open and close the exhaust ports, and a shaft portion formed on the upper portion thereof;

a protective cover coupled to the outer circumferential surface of the rotary cylinder;

an exhaust guide member coupled to the lower portion of the valve body for guiding exhaust gas discharged from a vacuum pump to the inlet of the rotary cylinder;

an adapter seated on the upper portion of the valve body and surrounding the shaft portion of the rotary cylinder;

an actuator coupled to the upper portion of the adapter for rotating the rotary cylinder in right and left directions; and sensing means mounted at the upper portion of the valve body for sensing the opening position of the exhaust ports, characterized in that a first sealing member is mounted between the rotary cylinder and the protective cover.

2. The exhaust valve for semiconductor manufacturing process according to claim 1, wherein a second sealing member is mounted between the chamber of the valve body and the outer circumferential surface of the protective cover.

3. The exhaust valve for semiconductor manufacturing process according to claim 1 or 2, wherein the first and second sealing members are O-rings.

* * * * *